United States Patent
Ori

(10) Patent No.: US 9,521,201 B2
(45) Date of Patent: *Dec. 13, 2016

(54) DISTRIBUTED RAID OVER SHARED MULTI-QUEUED STORAGE DEVICES

(71) Applicant: E8 Storage Systems Ltd., Ramat Gan (IL)

(72) Inventor: Zivan Ori, Tel Aviv (IL)

(73) Assignee: E8 STORAGE SYSTEMS LTD., Ramat Gan (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/997,600

(22) Filed: Jan. 18, 2016

(65) Prior Publication Data

US 2016/0134703 A1 May 12, 2016

Related U.S. Application Data

(63) Continuation of application No. 14/794,868, filed on Jul. 9, 2015, now Pat. No. 9,274,720.

(60) Provisional application No. 62/050,217, filed on Sep. 15, 2014.

(51) Int. Cl.
- *G06F 13/00* (2006.01)
- *H04L 29/08* (2006.01)
- *G06F 3/06* (2006.01)

(52) U.S. Cl.
CPC .......... *H04L 67/1097* (2013.01); *G06F 3/067* (2013.01); *G06F 3/0619* (2013.01); *G06F 3/0653* (2013.01)

(58) Field of Classification Search
CPC  G06F 12/0804; G06F 11/1076; G06F 3/0689; G06F 3/0659; G06F 11/1092

USPC .......................................................... 711/114
See application file for complete search history.

(56) References Cited

U.S. PATENT DOCUMENTS

| | | |
|---|---|---|
| 6,446,220 B1 | 9/2002 | Menon |
| 8,095,763 B2 | 1/2012 | Piszczek et al. |
| 8,510,265 B1 | 8/2013 | Boone et al. |
| 8,725,934 B2 | 5/2014 | Batwara et al. |
| 9,164,689 B2 | 10/2015 | O'Brien |
| 9,251,052 B2 | 2/2016 | Talagala et al. |
| 2003/0028725 A1* | 2/2003 | Naberhuis ............. G06F 3/0625 711/114 |

(Continued)

OTHER PUBLICATIONS

U.S. Appl. No. 14/697,653 Office Action dated Dec. 31, 2015.

(Continued)

*Primary Examiner* — Phuoc Nguyen
(74) *Attorney, Agent, or Firm* — D. Kligler I.P. Services LTD.

(57) ABSTRACT

A method for data storage includes, in a system that includes multiple servers and multiple storage devices, holding in a server a definition of a stripe that includes multiple memory locations on the storage devices, to be used by the servers for storing multiple data elements and at least a redundancy element calculated over the data elements. One or more of the data elements in the stripe are modified by the server, by executing in the storage devices an atomic command, which updates the redundancy element to reflect the modified data elements only if a current redundancy element stored in the storage devices reflects the multiple data elements prior to modification of the data elements, and storing the modified data elements in the storage devices only in response to successful completion of the atomic command.

22 Claims, 3 Drawing Sheets

(56) References Cited

U.S. PATENT DOCUMENTS

| | | |
|---|---|---|
| 2004/0153576 A1 | 8/2004 | Hansmann et al. |
| 2005/0050273 A1 | 3/2005 | Horn et al. |
| 2006/0031450 A1 | 2/2006 | Unrau et al. |
| 2007/0168396 A1* | 7/2007 | Adams ................. G06F 3/0607 |
| 2010/0153617 A1 | 6/2010 | Miroshnichenko et al. |
| 2010/0250831 A1 | 9/2010 | O'Brien et al. |
| 2011/0060887 A1 | 3/2011 | Thatcher et al. |
| 2011/0246720 A1 | 10/2011 | Nakamura et al. |
| 2011/0296133 A1 | 12/2011 | Flynn et al. |
| 2012/0079318 A1 | 3/2012 | Colgrove et al. |
| 2012/0144110 A1 | 6/2012 | Smith |
| 2012/0233396 A1 | 9/2012 | Flynn et al. |
| 2013/0046949 A1 | 2/2013 | Colgrove et al. |
| 2013/0198312 A1 | 8/2013 | Tamir et al. |
| 2013/0275447 A1 | 10/2013 | Ben-Tsion et al. |
| 2014/0040411 A1 | 2/2014 | Weber et al. |
| 2014/0289462 A9 | 9/2014 | Malwankar |
| 2015/0212752 A1 | 7/2015 | Nemazie et al. |
| 2016/0004642 A1 | 1/2016 | Sugimoto et al. |
| 2016/0034418 A1 | 2/2016 | Romem et al. |
| 2016/0162209 A1 | 6/2016 | Calderone |

OTHER PUBLICATIONS

International Application # PCT/IB2015/058842 Search Report dated Feb. 28, 2016.
U.S. Appl. No. 15/015,157 Office Action dated Jun. 8, 2016.
U.S. Appl. No. 14/697,653 Office Action dated May 3, 2016.
U.S. Appl. No. 15/086,102 Office Action dated Jul. 28, 2016.
International Application # PCT/IB2016/051958 Search Report dated Aug. 2, 2016.

* cited by examiner

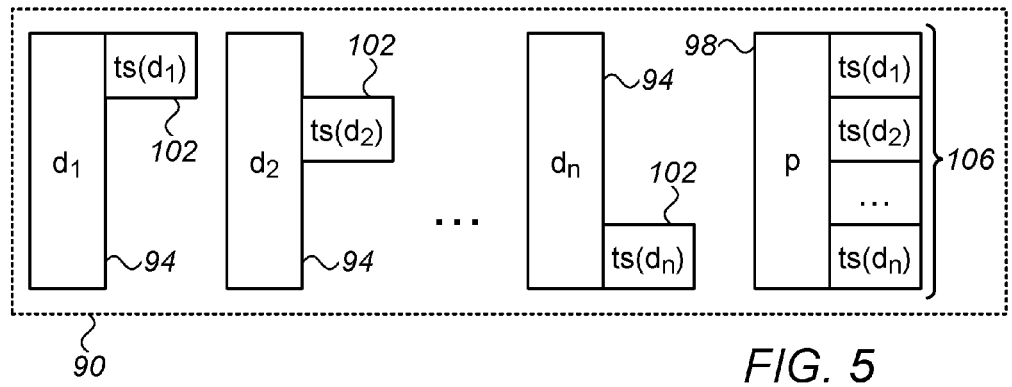
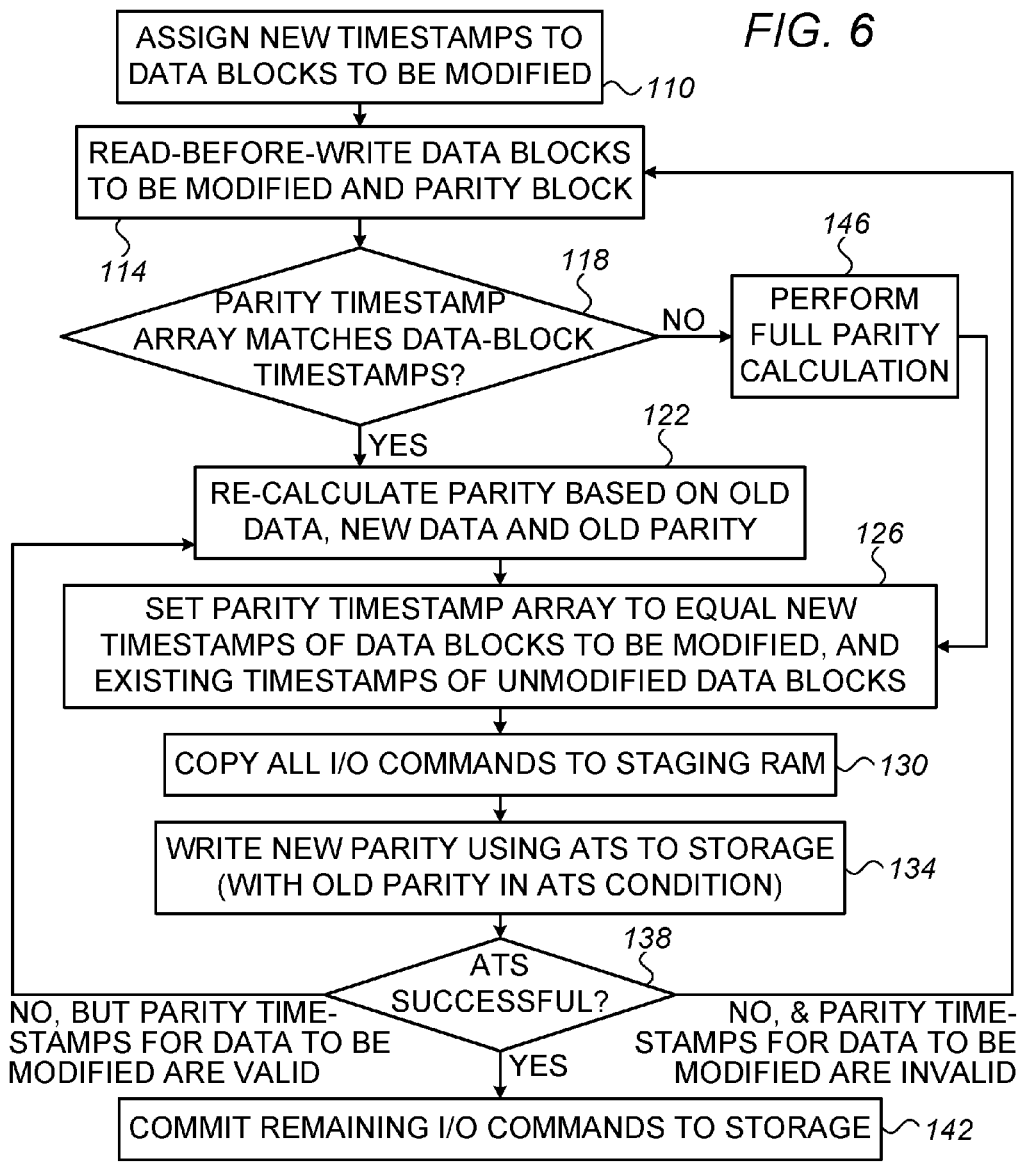
FIG. 5
FIG. 6

DISTRIBUTED RAID OVER SHARED MULTI-QUEUED STORAGE DEVICES

CROSS-REFERENCE TO RELATED APPLICATIONS

This application is a continuation of U.S. patent application Ser. No. 14/794,868, filed Jul. 9, 2015, which claims the benefit of U.S. Provisional Patent Application 62/050,217, filed Sep. 15, 2014. The disclosures of these related applications are incorporated herein by reference.

FIELD OF THE INVENTION

The present invention relates generally to data storage, and particularly to methods and systems for distributed storage.

BACKGROUND OF THE INVENTION

Various techniques for distributed data storage are known in the art. For example, PCT International Publication WO 2013/024485, whose disclosure is incorporated herein by reference, describes a method of managing a distributed storage space, including mapping a plurality of replica sets to a plurality of storage managing modules installed in a plurality of computing units. Each of the plurality of storage managing modules manages access of at least one storage consumer application to replica data of at least one replica of a replica set from the plurality of replica sets. The replica data is stored in at least one drive of a respective computing unit.

SUMMARY OF THE INVENTION

An embodiment that is described herein provides a method for data storage. The method includes, in a system that includes multiple servers and multiple storage devices, holding in a server a definition of a stripe that includes multiple memory locations on the storage devices, to be used by the servers for storing multiple data elements and at least a redundancy element calculated over the data elements. One or more of the data elements in the stripe are modified by the server, by executing in the storage devices an atomic command, which updates the redundancy element to reflect the modified data elements only if a current redundancy element stored in the storage devices reflects the multiple data elements prior to modification of the data elements, and storing the modified data elements in the storage devices only in response to successful completion of the atomic command.

In some embodiments, modifying the data elements includes caching the modified data elements, the current redundancy element and the updated redundancy element in an interim memory, and committing the modified data elements and the updated redundancy element from the interim memory to the storage devices only in response to the successful completion of the atomic command. Typically, the interim memory and the server belong to different failure domains of the system.

In an embodiment, the stripe is accessible to at least one additional server, and modifying the data elements is performed by the server without communication with the additional server. In another embodiment, modifying the data elements includes reading current data elements and the current redundancy element from the storage devices, and updating the redundancy element based on the current data elements, the modified data elements and the current redundancy element. Modifying the data elements may include, in response to failure of the atomic command, re-reading the current data elements and the current redundancy element from the storage devices, re-calculating the redundancy element and re-attempting to update the redundancy element using the atomic command.

In some embodiments, storing the data elements and the redundancy element includes storing respective timestamps with the data elements, and storing with the redundancy element a list of the timestamps of the data elements over which the redundancy element was calculated. In an embodiment, the method includes, prior to modifying the data elements, verifying that the timestamps of the data elements prior to the modification match the list of timestamps stored with the current redundancy element in the storage devices.

In some embodiments, storing the modified data elements includes storing the modified data elements in the storage devices only in response to successful completion of the atomic command, when different writers to the stripe are permitted to write to a same data or redundancy element concurrently, and, when the different writers to the stripe are cannot write to the same data or redundancy element concurrently, storing the modified data elements in the storage devices irrespective of the successful completion of the atomic command.

There is additionally provided, in accordance with an embodiment of the present invention, a data storage apparatus including an interface and a processor. The interface is configured to communicate with multiple storage devices. The processor is configured to hold a definition of a stripe that includes multiple memory locations on the storage devices to be used for storing multiple data elements and at least a redundancy element calculated over the data elements, and to modify one or more of the data elements in the stripe by: executing in the storage devices an atomic command, which updates the redundancy element to reflect the modified data elements only if a current redundancy element stored in the storage devices reflects the multiple data elements prior to modification of the data elements; and storing the modified data elements in the storage devices only in response to successful completion of the atomic command.

There is further provided, in accordance with an embodiment of the present invention, a computing system including multiple storage devices and multiple servers. At least one of the servers is configured to hold a definition of a stripe that includes multiple memory locations on the storage devices to be used by the servers for storing multiple data elements and at least a redundancy element calculated over the data elements, and to modify one or more of the data elements in the stripe by: executing in the storage devices an atomic command, which updates the redundancy element to reflect the modified data elements only if a current redundancy element stored in the storage devices reflects the multiple data elements prior to modification of the data elements; and storing the modified data elements in the storage devices only in response to successful completion of the atomic command.

There is also provided, in accordance with an embodiment of the present invention, a method for data storage. The method includes, in a system that includes multiple servers and multiple storage devices, holding in a server a definition of a stripe that includes multiple memory locations on the storage devices, to be used by the servers for storing multiple data elements and at least a redundancy element calculated over the data elements. One or more of the data elements in the stripe are modified by the server, by: under a lock on at least part of the stripe, updating the redundancy element in the storage devices to reflect the modified data elements only if a current redundancy element stored in the storage devices reflects the multiple data elements prior to modification of the data elements; and storing the modified data elements in the storage devices only in response to successful completion of the updating of the redundancy element.

The present invention will be more fully understood from the following detailed description of the embodiments thereof, taken together with the drawings in which:

BRIEF DESCRIPTION OF THE DRAWINGS

FIG. 5 is a diagram that schematically illustrates a RAID stripe that uses timestamps, in accordance with an embodiment of the present invention; and FIG. 6 is a flow chart that schematically illustrates a method for distributed RAID storage using timestamps, in accordance with an embodiment of the present invention.

DETAILED DESCRIPTION OF EMBODIMENTS

Overview

Figure 1:
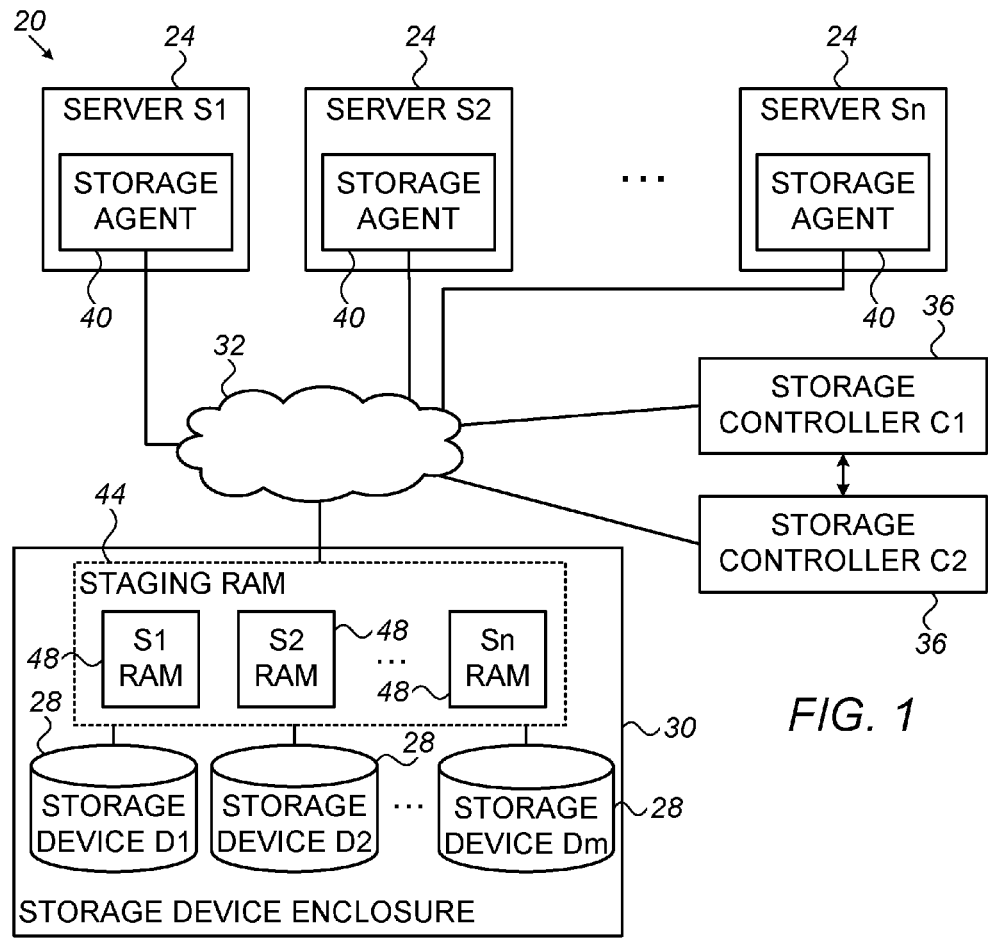
FIG. 1 is a block diagram that schematically illustrates a computing system that uses distributed data storage, in accordance with an embodiment of the present invention.

Embodiments of the present invention that are described herein provide improved methods and systems for implementing redundant storage, e.g., Redundant Array of Independent Disks (RAID), in a highly distributed manner. The disclosed techniques are typically implemented in a computing system comprising multiple servers that store data in multiple storage devices. Computing systems of this sort are described, for example, in U.S. patent application Ser. Nos. 14/599,510 and 14/697,653, which are assigned to the assignee of the present patent application and whose disclosures are incorporated herein by reference.

In some embodiments, the servers store the data on the storage devices in stripes, each stripe comprising multiple data elements and one or more redundancy elements (e.g., parity) computed over the data elements. The description below refers mainly to stripes that are made up of data and redundancy blocks, but the disclosed techniques can be used with other suitable types of data and redundancy elements. The terms "parity" and "redundancy" are used interchangeably herein.

At least some of the data stored on the storage devices is shared among the servers. In particular, multiple servers may write to the same stripe concurrently. Whereas concurrent access to the same block is typically handled at the application level, concurrent access to different blocks in the same stripe is usually not. Unless accounted for, concurrent access to different blocks in the same stripe may cause irrecoverable mismatch between the data and redundancy information in the stripe.

In some embodiments, the servers eliminate the above-described problem by writing the redundancy blocks using Atomic Test and Set (ATS) commands supported by the storage devices. A typical ATS command specifies an address for storage, new data to be written to that address, and a test value. The storage device tests whether the data currently stored in the address is equal to the test value, and writes the new data only if the test is successful. The test and subsequent write are performed by the storage device atomically, i.e., without allowing any intervening writes to the address in question.

In a typical flow, a server modifies data in a stripe by first reading the (one or more) data blocks to be modified, and the existing (one or more) redundancy blocks, from the storage devices. This step is referred to as "read-before-write." The server calculates the new redundancy blocks based on the new data blocks, the corresponding existing data blocks read from the storage devices, and the existing redundancy blocks read from the storage devices.

The server then writes the new data blocks using normal write commands, and writes the new redundancy blocks using ATS commands whose test values are the existing (old) redundancy values. By using ATS commands in this manner, the server ensures that no other writer (e.g., other server, process or application) has modified the redundancy blocks of the stripe since the read-before-write step.

In some embodiments, the servers further improve the above process by attaching timestamps to the data and redundancy blocks. In these embodiments, a writing server attaches a timestamp to each new data block it writes to a stripe. In addition, each redundancy block comprises a timestamp array, which comprises a respective timestamp for each data block over which the redundancy block has been calculated. The timestamps and timestamp arrays may be attached to the data and redundancy blocks, for example, as per-LBA metadata. This structure enables the servers to verify that the redundancy blocks and the data blocks are indeed consistent with one another.

In some embodiments, the system further comprises an interim memory, also referred to as "staging RAM." A writing server typically writes the data and redundancy blocks to the staging RAM, and commits them to the storage devices only after verifying that all data and redundancy blocks have been written successfully to the interim memory. This mechanism eliminates "write hole" scenarios in which a writing server fails during a write transaction. The staging RAM and server are typically assumed to belong to different failure domains of the system. In one example embodiment, the staging RAM resides in the same enclosure as the storage devices.

Various example storage processes that use the above mechanisms are described herein. In some embodiments, the locking functionality provided by the ATS command is replaced by another suitable lock on at least part of the stripe. The disclosed techniques enable multiple servers to implement redundant storage (e.g., RAID) in shared storage, without a need for any centralized entity and without a need for servers to communicate with one another for coordination.

System Description

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

In the present example, although not necessarily, storage devices 28 are comprised in a storage-device enclosure 30, e.g., a rack, drawer or cabinet. Enclosure 30 further comprises a staging Random Access Memory (RAM) unit 44 that comprises multiple staging RAMS 48. The staging RAM unit is used as a front-end for temporary caching of I/O commands en-route from servers 24 to storage devices 28. Staging RAMS 48 are therefore also referred to herein as interim memory. The structure and functionality of the staging RAM are addressed in greater detail below. Enclosure 30 may also comprise a Central Processing Unit (CPU—not shown).

Storage-related functions in each server 24 are carried out by a respective storage agent 40. Agents 40 typically comprise software modules installed and running on the respective servers. The functions of agents 40, and their interaction with storage devices 28 and storage controllers 36, are described in detail below.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). In an example embodiment, storage devices 28 comprise multi-queued SSDs that operate in accordance with the NVMe specification. Network 32 may operate in accordance with any suitable communication protocol, such as Ethernet or Infiniband. In some embodiments, some of the disclosed techniques can be implemented using Direct Memory Access (DMA) and/or Remote Direct Memory Access (RDMA) operations.

Generally, system 20 may comprise any suitable number of servers, storage devices and storage controllers. In the present example, the system comprises two storage controllers denoted C1 and C2, for resilience. One of the storage controllers is defined as primary, while the other controller serves as hot backup and can replace the primary storage controller in case of failure.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

The configuration of system 20 shown in FIG. 1 is an example configuration, which is chosen purely for the sake of conceptual clarity. In alternative embodiments, any other suitable system configuration can be used. The different system elements may be implemented using suitable hardware, using software, or using a combination of hardware and software elements.

Each server 24 typically comprises a suitable network interface for communicating over network 32, e.g., with the storage devices and/or storage controllers, and a suitable processor that carries out the various server functions. Each storage controller 36 typically comprises a suitable network interface for communicating over network 32, e.g., with the storage devices and/or servers, and a suitable processor that carries out the various storage controller functions.

In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
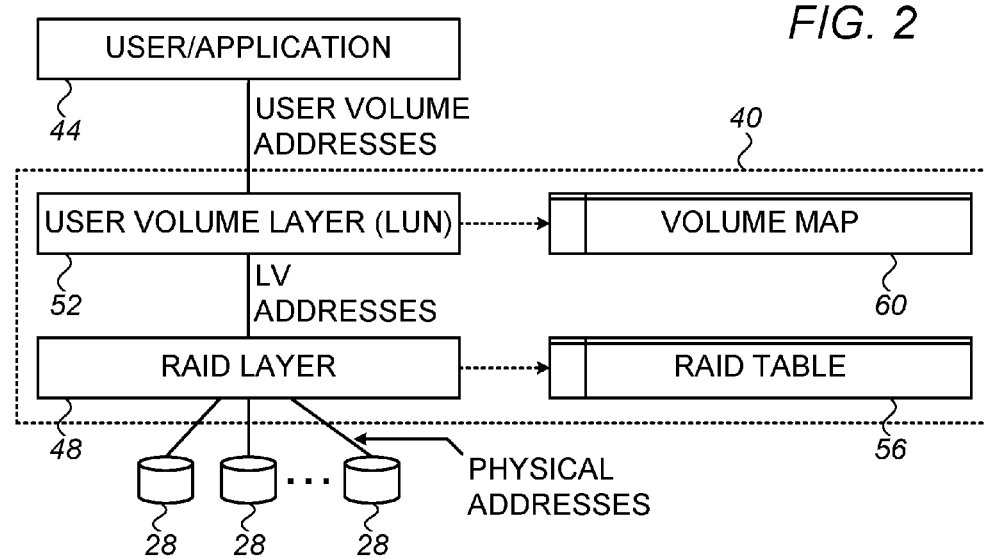
FIG. 2 is a block diagram that schematically illustrates elements of a storage agent, in accordance with an embodiment of the present invention.

FIG. 2 is a block diagram that schematically illustrates elements of storage agent 40, in accordance with an embodiment of the present invention. A respective storage agent of this sort typically runs on each server 24 and performs storage-related functions for user applications 44 running on the server. As noted above, servers 24 may comprise physical and/or virtual servers. Thus, a certain physical computer may run multiple virtual servers 24, each having its own respective storage agent 40.

In the disclosed embodiments, each storage agent 40 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In one simple example embodiment, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy. Alternatively, however, RAID layer 48 may implement any other suitable redundant storage scheme (RAID-based or otherwise), such as schemes based on erasure codes.

RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all logical-to-physical address translations are performed in agents 40 in the servers, and none in the storage devices.

The RAID layer maps between physical addresses and Logical Volumes (LVs) to be used by user-volume layer 52. Each LV is mapped to two or more physical-address ranges on two or more different storage devices. The two or more ranges are used for storing the replicated copies of the LV data as part of the redundant storage scheme.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The terms "user volume" and "LUN" are used interchangeably herein. In other words, a user application 44 views the storage system as a collection of user volumes, and issues storage commands having user-volume addresses.

Storage agent 40 translates between the different address spaces using a RAID table 56 and a volume map 60. RAID table 56 holds the translation between LV addresses and physical addresses, and volume map 60 holds the translation between user-volume addresses and LV addresses.

Typically, any server 24 may attach to any user volume. A given user volume may have multiple servers attached thereto. In some embodiments, storage controllers 36 define and maintain a global volume map that specifies all user volumes in system 20. Volume map in each storage agent 40 comprises a locally-cached copy of at least part of the global volume map. In agent 40 of a given server, volume map 60 holds at least the mapping of the user volumes (LUNs) to which this server is attached. In an embodiment, volume map 60 supports thin provisioning.

Certain aspects of distributed storage systems of the sort shown in FIGS. 1 and 2 are also addressed in U.S. patent application Ser. Nos. 14/599,510 and 14/697,653, cited above.

Basic Storage I/O Path

As noted above, system 20 is designed such that data-path storage commands are exchanged directly between servers 24 and storage devices 28, and do not involve the CPUs of storage controllers 36. In the present context, the terms "directly" and "not via the storage controllers" address the logical information flow, and not necessarily a geographical or physical flow. For example, in one embodiment the storage devices are implemented in a certain storage rack, and the storage controllers are implemented as software modules that run on CPUs in the same rack. Since the data-path storage commands do not trigger or otherwise involve the CPUs, this configuration also qualifies as a direct exchange of commands not via the storage controllers.

In some embodiments, all storage devices 28 have the same formatting and the same guarantees for atomicity, e.g., using 512-byte sectors. The various storage functions preserve the atomicity guarantees of storage devices 28. Thus, the user volumes exposed to applications 44 typically have the same formatting as the storage devices, e.g., 512-byte sectors, aligned to the 512-byte sectors of the storage devices.

The embodiments described herein assume that each storage device 28 provides multiple server-specific queues for storage commands, and has the freedom to queue, schedule and reorder execution of storage commands. In some embodiments, agent 40 in each server 24 maintains a respective queue per storage device, corresponding to the respective server-specific queues of the storage devices. Agents 40 and storage devices 28 are permitted to reorder storage commands in the queues. The queues in a given agent 40 have no visibility outside the context of the respective server.

In the disclosed embodiments, it is possible that two or more servers attempt to access a given sector in a storage device concurrently. In such a case, no guarantee is given as to which access will be completed first. The servers are expected to coordinate this competition for resources.

Raid Layer Considerations

In the disclosed embodiments, agents 40 in servers 24 carry out the various redundant storage (e.g., RAID) functions in a fully distributed manner, without involving the CPUs of storage controllers 36. Since the RAID layer is distributed among the servers, each server 24 accessing a certain physical storage device 28 holds all the information needed for its RAID functionality in RAID table 56.

In some embodiments, storage devices 28 are grouped together in a RAID group. In an example RAID-10 example, N storage devices are grouped together and expose a capacity that is 50% of the actual total storage capacity of the storage devices. In an example embodiment, RAID table 56 in each agent 40 comprises a constant-length extent table that maps logical address ranges to physical address ranges.

In an example implementation, the logical address space of the system is divided into 1 GB ranges. Each 1 GB range of logical addresses has two entries in RAID table 56, pointing to two 1 GB physical address-space ranges on two different storage devices 28. The RAID table is typically predefined, and changes only rarely, e.g., upon removal or addition of physical storage devices. The RAID table of a given RAID group is typically written by storage controllers 36 and distributed to agents 40 in the various servers 24 that access this RAID group.

Upon serving a write request, RAID layer 48 typically looks-up the logical address specified in the request, and translates the logical address to two physical addresses on the storage devices, by querying RAID table 56. The RAID layer then issues two write requests in parallel to the two storage devices.

The RAID-10 functionality described above is depicted purely by way of example, in order to demonstrate the concept of direct and fully-distributed RAID operation. Alternatively, any other suitable redundant storage scheme can be used, such as, for example, RAID-1, RAID-5, RAID-6, RAID-50, RAID-60, 3-parity RAID (N+p+q+r), or any other suitable scheme. Generally speaking, when a given server 24 issues a write requests, agent 40 of this server translates the write request into a sequence of write requests (and possibly read requests), and executes them in the appropriate storage devices 28.

In the disclosed embodiments, RAID storage is performed in a group of memory blocks referred to as a RAID stripe, or simply strip for brevity. A given RAID stripe comprises multiple data blocks that store data, and one or more redundancy blocks that store redundancy information. Any suitable type of redundancy function can be used for computing the redundancy information, e.g., a bit-wise XOR, a Reed-Solomon (RS) code, or any other suitable type of redundancy. The redundancy blocks and redundancy information, regardless of type, are referred to below as parity blocks and parity information.

In some RAID schemes, if less than the full stripe is being modified, a write operation involves reading the old data and the old parity before writing the new data and parity, and deriving the new parity from the new data, the old data and the old parity. In the disclosed embodiments, the server issuing the write request typically performs this read-before-write from the storage devices, and then calculates the new parity. If all the data in a stripe is modified, there is no need to perform read-before-write since the new parity can be calculated based on the new data, regardless of the old data and the old parity.

Write-Hole Problem and Solution

In the disclosed embodiments, a given RAID stripe can be accessed (read and written) by one or more servers 24. If a server fails in the middle of a write operation (e.g., after writing the data and before writing the parity), the parity of the stripe will be incorrect and uncorrectable. This problem is referred to as a "write-hole problem."

In some embodiments, system 20 overcomes this problem by first accumulating all the write requests (of data and parity) in staging RAMS 48. Only after all the data and parity that is to be modified in the stripe is saved in the staging RAMS, the write requests are committed to storage devices 28. An underlying assumption is that the staging RAMS do not belong to the same failure domain as the servers. Under this assumption, failure of a server does not affect the information already saved in the staging RAMS.

In the embodiment of FIG. 1, to perform the above mechanism, staging RAM unit 44 comprises a respective staging RAM 48 per server 24. Each staging RAM 48 comprises m queues, such that the $i^{th}$ queue is used for buffering the write requests destined for the $i^{th}$ storage device. When the $j^{th}$ server issues a write transaction, the server writes the appropriate (data and parity) write requests to the appropriate queues in the $j^{th}$ staging RAM.

Only after ensuring (e.g., using acknowledgements from the staging RAM unit) that all write requests are saved correctly in the staging RAM, the server sends the staging RAM unit an instruction to commit the write requests to the appropriate storage devices 28. If the server fails during the storage transaction, the transaction can be completed successfully by the storage devices, independently of the server failure, since all information is available in the Staging RAM.

The operation of staging RAM unit 44, including accumulating write requests and later committing them to the storage devices, is typically performed without any involvement of a CPU in enclosure 30, if one exists. Since the staging RAMS are used for interim storage of in-flight write requests, the size of the staging RAMS depends on the expected throughput of write requests, rather than on the memory size of storage devices 28. The staging RAM configuration described above is depicted purely by way of example. In alternative embodiments, any other suitable configuration can be used.

Data and Parity Writing Race Resolution

As noted above, a given RAID stripe can be written by multiple servers 24. This concurrency presents several challenges. One problematic scenario occurs when two servers attempt to write to the same block simultaneously. This scenario is not solved herein, and the assumption is that the applications or severs coordinate simultaneous access to the same block using a SCSI reservation or other locking mechanism.

A more problematic scenario, directly related to the disclosed distributed RAID architecture, occurs when multiple servers attempt to write simultaneously to different blocks that belong to the same RAID stripe. Consider, for example, two servers that attempt to perform write transactions simultaneously in the same RAID stripe.

This scenario involves two generally-uncorrelated races between the servers, one for writing the data and the other for writing the parity. If one server wins both races (i.e., writes both data and parity before the other server), there is no coherency issue. If, on the other hand, each race is won by a different server, the final parity will not match the final data of the stripe.

Consider, for example a RAID stripe [d1, d2, . . . , dn, p1], wherein d1 . . . dn denote data blocks and p1 denotes a parity block. Consider a scenario in which a server s1 attempts to update d1 (and also to update p1 to reflect the update of d1), and a server s2 attempts to update d2 at the same time (and thus also update p1 to reflect the update of d2). Assume that server s1 updates d1 before server s2 updates d2, but server s2 updates p1 before server s1. In such a case, when both transactions are complete, p1 will not be the correct parity for the updated values of d1 and d2.

It may be possible in principle to avoid such scenarios using various centralized synchronized locking mechanisms. Such solutions, however, necessarily introduce some centralized entity into the heart of the data path, and may also involve communication between the servers. The description below describes several alternative solutions that are fully distributed and do not involve any communication or coordination between the servers.

In some embodiments, the disclosed technique uses "Atomic Test and Set" (ATS) commands supported by storage devices 28. In T10 SCSI, for example, the ATS command is referred to as "Compare and write" and standardized as opcode 0x89. An ATS command typically specifies the block address to be written to (e.g., in terms of Logical Block Address—LBA), the data to be written, and a condition to be tested. The storage device tests the condition ("test"), and performs the write ("set") only if the condition is met. The testing and setting are performed atomically, i.e., they cannot be intervened by any other write operation to the address specified in the command.

In the disclosed embodiment, each server first writes the parity to a RAID stripe using an ATS command rather than using a regular write I/O. The condition ("test" value) of the ATS command will be the result of the read-before-write of the parity, which the server performs in order to re-calculate the parity. When multiple servers attempt to write to the same stripe concurrently, only one of them will succeed in updating the parity using ATS. The other servers will fail in performing the ATS. The successful server may proceed to write the other elements in the stripe (e.g., data). The unsuccessful server(s) will retry the ATS command, after re-executing the read-before-write and re-calculating a new parity so as to take into account the recent parity update.

Figure 3:
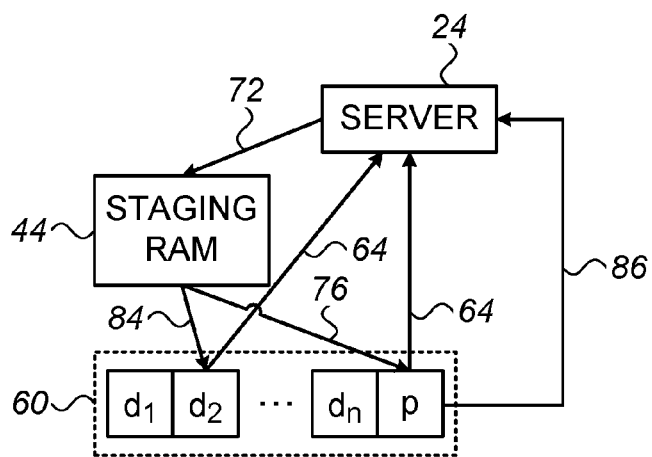
FIGS. 3 and 4 are a diagram and a flow chart that schematically illustrates a method for distributed RAID storage, in accordance with an embodiment of the present invention.
Figure 4:
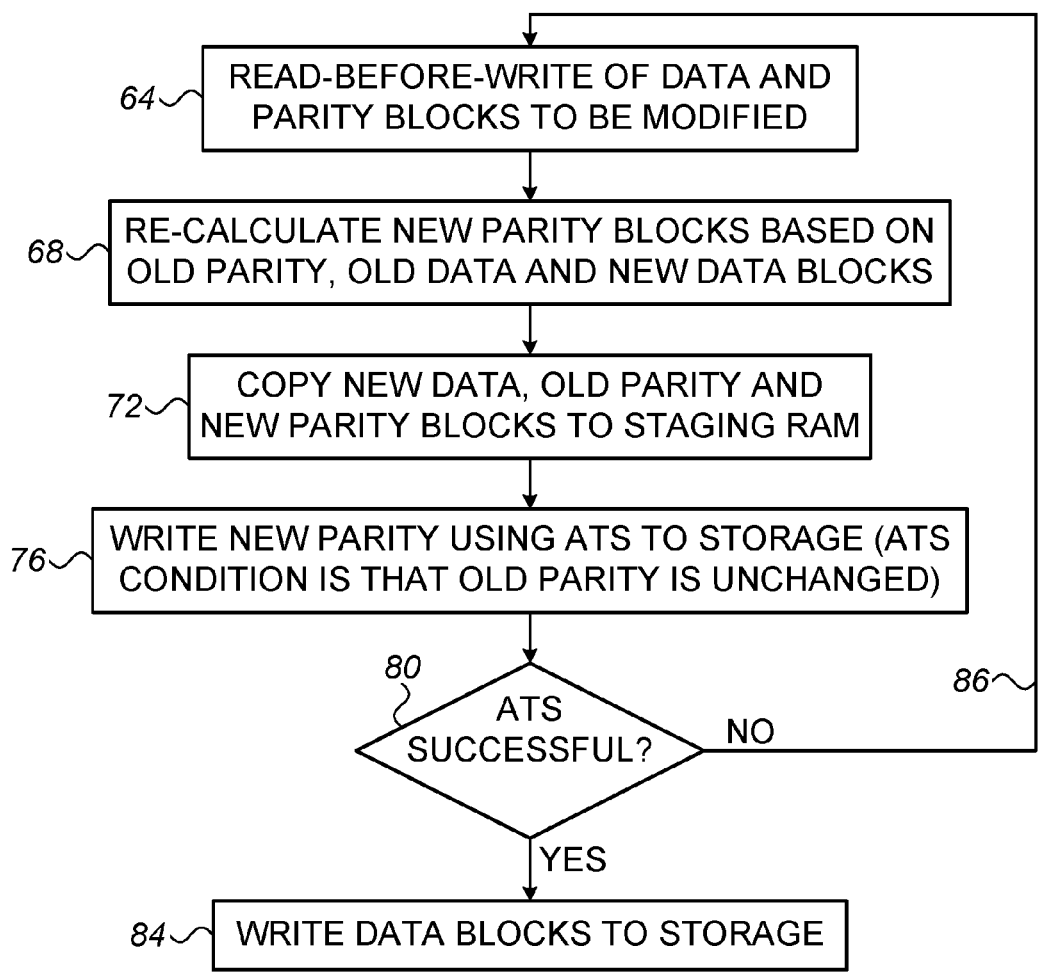

FIGS. 3 and 4 are a diagram and a flow chart that schematically illustrates a method for distributed RAID storage using ATS, in accordance with an embodiment of the present invention. The description that follows refers to the two figures in parallel—Arrows in FIG. 3 are marked with the same reference numerals as the corresponding method steps of FIG. 4. For the sake of clarity, in the present example each stripe comprises a single parity block. The method can be adapted in a straightforward manner to RAID schemes that define multiple parity blocks per stripe.

In the present example, a server 24 attempts to perform a RAID transaction that updates data in a block d2 of a RAID stripe 60 using RAID-5. The RAID transaction should also write a corresponding update to parity block p of this stripe. The actions below are typically performed by agent 40 in the server.

The method begins with the server performing read-before-write of the various elements (data and parity) to be modified, at a read-before-write step 64. In the present example, the server reads d2 and p from storage devices 28.

At a parity re-calculation step 68, the server re-calculates new parity elements based on the old data elements, the old parity elements, and new data elements. In the present example, the server calculates the new parity (denoted new_p) by calculating the bit-wise XOR of the old parity, the old d2 and the new d2 (denoted old_p, old_d2 and new_d2, respectively).

At a copying step 72, the server writes all the I/O commands of the RAID transaction to staging RAM unit 44. In the present example, the server copies new_d2, old_p and new_p to the staging RAM.

At a parity updating step 76, the server issues an ATS command that attempts to update the parity in the storage device holding p. In the present example, the test condition in the ATS command instructs the storage device to write the new parity new_p, if and only if the currently-stored parity value is equal to the old parity old_p.

If the ATS condition is met, the server may conclude that the parity that is currently stored in p (old-p) is the same parity used for re-calculating the new parity (new_p). In other words, the ATS condition ensures that the parity was not modified by another server or process since the parity was read at read-before-write step 64.

The server checks whether the ATS command was successful, at an ATS checking step 80. If successful, the server proceeds to commit the remaining I/Os from staging RAM 44 to storage devices 28. In the present example, the server instructs the staging RAM to commit the write request of d2 to the appropriate storage device.

If, on the other hand, the ATS command has failed (with status "ERROR_TEST_FAILED"), the server concludes that the parity was modified by another server or process since read-before-write step 64 was performed. In such a case, the method loops back to step 64 above, and the server re-attempts the entire transaction. In the re-attempted read-before-write, the read value of old_p will be the modified value that caused the ATS command to fail.

Reader's Race Resolution Using Timestamps in LBA-Metadata

In practice, when using the process of FIGS. 3 and 4 above, the period of time between execution of the ATS command (step 76) and writing of the remaining blocks (step 84) still leaves some possibility for inconsistency. During this short time period, the parity has already been updated in the storage devices, but the corresponding data is not fully committed yet. If another server or process were to read-before-write from the same stripe during this period, the read data and/or parity may be inconsistent.

In some embodiments, system 20 overcomes this problem using timestamps or other suitable identifiers that are indicative of the generation order of the data. In an embodiment, when a server issues a write request for a certain data block, the server assigns the data block an identifier that is indicative of the time at which the write request was issued.

The description that follows uses the term "timestamp" for the sake of clarity. Generally, however, the disclosed technique can be carried out using any suitable identifier that is (i) indicative of the generation time or generation order of the data, and (ii) cannot be co-assigned by different servers. Thus, in some embodiments the timestamp comprises a unique identity of the server.

For example, each server may increment an ever-increasing counter value (or a cyclically increasing counter value with a large period) that is incremented with every additional data block sent for storage. The server may assign each data block that is sent for storage a timestamp having the format [unique ID of the server, current counter value of the server]. This format eliminates the possibility that two servers assign the same timestamp.

In some embodiments, the server attaches the timestamp to the data block as per-LBA metadata. For example, some storage devices support per-LBA metadata fields that are used for storing a checksum for the LBA, e.g., a T10 Protection Information (T-10 PI) checksum. System 20 may use these per-LBA metadata fields, or a portion thereof, for storing the timestamps along with the corresponding data blocks. An underlying assumption is that the per-LBA metadata is written atomically with the data of this LBA by the storage device.

In addition, each parity block comprises an array of timestamps. The timestamp array is attached by the server sending the parity block for storage. The timestamp array of a parity block comprises the timestamps of the data blocks over which the parity block was calculated. The timestamp array may also be attached to the parity block as per-LBA metadata. With these data structures in place, any server can verify without ambiguity whether a parity element indeed matches (i.e., was calculated over) a given set of data elements.

FIG. 5 is a diagram that schematically illustrates a RAID stripe 90 that uses timestamps, in accordance with an embodiment of the present invention. Stripe 90 comprises n data blocks 94 denoted d1 . . . dn, and a parity block 98 denoted p. Data blocks d1 . . . dn are assigned respective timestamps 102 denoted ts(d1) . . . ts(dn), respectively. Parity block p is assigned an array 106 of time stamps. The values of ts(d1) . . . ts(dn) in array 106 are equal to the respective values of the ts(d1) . . . ts(dn) time stamps of the data blocks whose data was used for calculating the parity block p.

FIG. 6 is a flow chart that schematically illustrates a method for distributed RAID storage using timestamps, in accordance with an embodiment of the present invention. The method is typically carried out by agent 40 in a server 24 that modifies one or more data blocks in a RAID stripe.

For the sake of clarity, in the present example each stripe comprises a single parity block. The method can be adapted in a straightforward manner, however, to RAID schemes that define multiple parity blocks per stripe.

The method begins with the server assigning a new timestamp 102 each of the data blocks that are to be modified (referred to as "new data blocks"), at a timestamp assignment step 110. This step is typically performed once per RAID transaction. At a read-before-write step 114, the server reads the "old data blocks"—The data stored in storage devices 28 in the addresses of the data blocks to be modified, prior to the modification. The server also reads the parity block. As explained above, each data block is read together with per-LBA metadata that comprises a respective timestamp 102, and the parity block is read together with per-LBA metadata that comprises a timestamp array 106.

The server compares the timestamps 102 of the read data blocks ("old data blocks") to the corresponding timestamps in timestamp array 106 of the read parity block ("old parity block"), at a timestamp comparison step 118. In case of mismatch, the server may retry the comparison, e.g., one or two additional times. If the mismatch persists, the server reverts to perform a full stripe parity calculation, at a full calculation step 146.

For performing full parity calculation, the server first performs a read-before-write of all the data blocks in the stripe, except for the data blocks that are intended to be modified. Timestamp mismatch is permitted at this stage, since the entire parity information is now calculated, and incorrect timestamps will soon be replaced. The server then calculates new parity for the parity block based on the old data blocks (that are not intended to be modified) and the new data blocks (that are intended to be modified). Note that the old parity, which may be incorrect, is ignored. The method then proceeds to step 126 below.

If, on the other hand, timestamp comparison step 118 concludes that timestamps 102 of the data blocks match the corresponding timestamps in timestamp array 106 of the parity block, the server proceeds to re-calculate the parity block, at a parity re-calculation step 122. The server re-calculates the parity block based on the old data blocks, the new data blocks and the old parity block.

At a timestamp array updating step 126, the server sets timestamp array 106 of the parity block to equal the new timestamps 102 for the data blocks to be modified, and to equal the existing timestamps 102 for the data blocks that are not modified.

The server now copies all I/O write commands to be executed to staging RAM unit 44, at a copying step 130. At an ATS step 134, the server writes the new parity block to the storage devices using an ATS command. The test condition in the ATS command requires that the old parity is unchanged in the storage devices.

At an ATS checking step 138, the server checks whether the ATS command was successful. If successful, the server commits all remaining I/O write commands concurrently to storage devices 28, at a committal step 142, and the method terminates.

If the ATS command has failed with status "ERROR_T-EST_FAILED," i.e., the content of the parity block is different from the expected content, the server concludes that some intervening write has occurred since read-before-write step 114. In this case, the ATS command should be re-attempted. At least some of the parity information, however, may no longer be valid.

Thus, in an embodiment, the server reads the existing (new) parity from storage devices 28. If parity timestamps 102 of all the data blocks to be modified are identical to the respective timestamps in array 106 of the new parity block that was just read, the server concludes that the intervening write did not modify any of the data that the present transaction intends to modify. In this case the method loops back to step 126 for re-calculating the parity.

Otherwise, i.e., if at least one parity timestamp 102, of a data block to be modified, differs from the respective timestamp in array 106 of the new parity block that was just read, the server concludes that the intervening write modified some of the data that the present transaction intends to modify. In this case the method loops back to step 114 for repeating the read-before-write operation. Typically, it is not necessary to read-before-write all the data blocks to be modified, only the data blocks to be modified for which a timestamp mismatch was found at step 138.

When performing the above process, the ATS commands may fail due to more than two concurrent writers (e.g., servers or processes) that attempt to write to the RAID strip in question. The logic and behavior of the servers, however, remains the same as in the case of two concurrent writers. The other writers will keep retrying to perform their ATS command. This process effectively serializes the write requests per RAID stripe, but in a fully distributed manner.

When carrying out redundant storage in accordance with the method of FIG. 6, when two writers attempt to modify the same block, only one of the writers will succeed due to the ATS mechanism. The other writer will have to wait for the first writer to complete the data write operation, not only the parity write operation, because only then the timestamps will match in the data blocks and parity block.

On the other hand, when two writers attempt to modify two different blocks in the same stripe, the second writer can issue its write commands as soon as its ATS command succeeds, without having to wait for the write operations of the first writer to complete (since their content does not affect the write operations of the second writer). Thus, although writes to a stripe are serialized by use of the ATS mechanism, data updates are not serialized (as long as the writers write to different blocks within the stripe, which is usually the case).

Additional Variations and Optimizations

Writer Collaboration

In some embodiments, by coordination between writers (e.g., servers 24 or applications running on the servers), it is possible to eliminate the need for a server to wait for its ATS command to complete. Consider an implementation in which all the applications writing to a particular LUN can guarantee collaboration, i.e., guarantee that they do not write to the same block concurrently. Such collaboration may be implemented, for example, using SCSI reservations or SCSI ATS commands. In such a case, a given server does not have to wait for its ATS command to complete before issuing the remaining write I/O commands. This success-oriented approach reduces latency. The flow of this process is typically the same as that of FIG. 6, with the exception that steps 134 and 142 are merged.

Application ATS

In some implementations, applications running on servers 24 may issue SCSI ATS commands. Such commands, referred to herein as "application ATS" are typically used for implementing central locks for the benefit of the application, usually on portions of user volumes. In some embodiment, agents 40 of system 20 support application ATS commands, and execute them in a similar manner to the RAID-related processes described above, with two exceptions:

A. In the read-before write step (e.g., step 64 of FIG. 4 or step 114 of FIG. 6), verify whether the existing content of the data block is equal to the "Test" value of the application ATS. If a mismatch is found, fail the application ATS request and return "ERROR_ATS_T-EST."

B. The fully collaborative writer optimization does not apply to application ATS. Thus, steps 76 and 84 of FIG. 4 (or steps 134 and 142 of FIG. 6) should be kept separate and not merged. In an embodiment, agent 40 sends to the storage device, because the ATS issued for updating the redundancy of the stripe ensures application-ATS serialization. In one rare scenario, all redundancy elements of the stripe are missing (e.g., because the storage devices on which they are stored have all failed). In this scenario, the write of the data itself should be performed using ATS.

Full-Stripe Write Optimization

In the case of full-stripe write (in which all data blocks and redundancy blocks are updated), there is no need to read-before-write the existing data blocks since the new redundancy is calculated entirely based on the new data. For fully-collaborative writers, there is no need to perform ATS in a full-stripe write since the entire stripe is being overwritten. The flow in this case is simpler:

A. Assign new timestamps 102 to all data blocks.
B. Calculate new redundancy blocks based only on the new data elements, regardless of the old data and the old redundancy.
C. Set timestamp arrays 106 in the redundancy blocks to equal the new timestamps 102 assigned at step A.
D. Copy all I/O commands to the staging RAM.
E. Issue all I/O commands (data and redundancy) concurrently to the storage devices (all using regular write commands, no need for ATS).

Write Hole (Server Failure) Problem

If a server fails in the middle of a RAID transaction, some of the I/O commands may have been completed, and others may have not. For example, in one scenario the ATS command has completed successfully, but the data write commands have not. Various other failure scenarios are possible. In such cases, the information in the strip is irrecoverable since the redundancy information is inconsistent with the data.

As explained above, in some embodiments these scenarios are mitigated using staging RAMS 48, which hold the various I/O requests being performed, and should allow a storage controller or another server the ability to retry these I/O requests.

In an embodiment, storage controller 36 regularly monitors servers 24 for liveliness. Upon detecting a server failure (e.g., disappearance or crash), the storage controller may handle orphan I/O requests belonging to the failed server, and perform the retries that the server was supposed to perform. Before attempting this action, the storage controller will typically ping the server for liveliness. If the server is indeed unresponsive, the storage controller will typically black-list it as failed (e.g., prevent the server from issuing new I/O requests).

Staging RAM Concurrent Access

As explained above, in some embodiments each server is assigned a respective staging RAM 48. This assignment is typically performed upon setup of the server in system 20 by storage controller 36. Staging RAM 48 for a given server 24 is typically reserved for that server alone, and there is therefore no need to lock it as it is not being written to concurrently by any other server.

In case of server failure, storage controller 36 will typically perform clean-up of the staging RAM assigned to that server, and eventually release this staging RAM for other purposes.

Staging RAM Failure

In some cases a writing server may detect that its assigned staging RAM 48 (or the entire staging-RAM unit 44) has failed or is otherwise unavailable. In some embodiments, the server may re-attempt the entire write request (for the entire RAID transaction) via another path to storage devices 28. Many storage device configurations enable this sort of solution. A group of storage devices configured as "Just a Bunch Of Disks" (JBOD), for example, has two front-end I/O elements for redundancy. Thus, it is possible that each of these front-end elements will have its own RAM and that the two front-end elements belong to separate failure domains.

Staging RAM and Writing Server Failure

In some cases the writing server may fail concurrently with its staging RAM 48 (or with the entire staging-RAM unit 44). In case of such a double failure, the RAID stripe may become corrupted, e.g., when some of the write I/O commands are committed by the storage devices and some are not. Moreover, in such a scenario there is usually no record that this I/O request took place, so there is no hint for a storage controller or another server to perform stripe recovery.

In such a scenario, the data blocks that the failed server was trying to write to become inconsistent, which is permissible according to the SCSI standard. One problematic issue is that the redundancy blocks do not necessarily reflect the correct data. System 20 may provide various solutions to this problem.

In one embodiment, the above problem is avoided using staging RAM redundancy. For example, the writing server may write each I/O request to two separate staging RAMS 48. Additionally or alternatively, system 20 may run a background scrubbing process that detects inconsistencies between timestamps 102 and timestamp arrays 106, and perform stripe recovery as needed (including re-calculation of redundancy blocks).

Scrubbing Process

As noted above, system 20 may run a scrubbing process that periodically reads data blocks from the storage devices and verify that the corresponding redundancy blocks are correct. The verification may consider the data and redundancy information itself, or it may be based on comparing timestamps 102 and timestamp arrays 106. As noted above, such inconsistency may be indicative of a potential server failure and/or staging-RAM failure. Upon detecting inconsistency, the redundancy information should typically be re-calculated, e.g., by a storage controller or by a functional server.

The rate at which the scrubbing process is performed may vary depending on implementation. Typically, the scrubbing process updates the redundancy blocks using ATS commands or other form of locking, as explained above.

Degraded Read

When one of the data blocks in a RAID stripe is missing, e.g., due to storage device failure, a reading server may reconstruct the data in the missing data block using the redundancy block(s) and the remaining data blocks of the stripe. This reconstruction is sometimes referred to as "degraded read."

Since, in some embodiments, the redundancy blocks contain a respective timestamp for each data block in the stripe, the reading server can verify that the redundancy blocks are correct (i.e., consistent with the data blocks) by checking the timestamps in timestamp array 106 against timestamps 102 of the corresponding data blocks.

In case of timestamp mismatch, the missing data block cannot be reconstructed. This may be a transient effect due to a race condition with a stripe update, and therefore the reading server should typically re-attempt the entire operation before declaring failure. If the timestamp mismatch is persistent after several attempts, the reading server may attempt to lock the LUN in question, or parts thereof, via SCSI reservation, and re-attempt the degraded read again. If this attempt also fails, the stripe may be irrecoverable (e.g., the reading server may receive MEDIUM_ERROR).

In an example embodiment, a degraded read process may involve the following steps:
A. If all the missing blocks are redundancy blocks, no further action is needed during degraded read since the data is intact. Thus, a regular read flow is executed.
B. Read all the available data blocks in the stripe, and the available redundancy blocks.
C. Verify that the timestamps in array 106 in the redundancy blocks match timestamps 102 of the available data blocks. In case of a mismatch, re-attempt step B several times until the timestamps match, to rule out a possible transient effect due to a concurrent write.
D. If even after several attempts the timestamps do not match, attempt to lock the LUN or parts thereof and then re-attempt step B one final time.
E. If the timestamps match, the missing data block can now be reconstructed. For RAID-5, for example, in case the storage device containing d1 has failed, the d1 data can be reconstructed as $d1 = p - \text{sum}(d2 \ldots d8)$.
F. If the timestamps do not match, the missing data block cannot be reconstructed, and if the re-attempts described above have not resolved the situation, return a MEDIUM_ERROR to the host.

Degraded Write

When a RAID stripe has missing blocks, e.g., due to storage device failure or other storage device unavailability, system 20 can still receive and perform write requests in the strip. This process is sometimes referred to as "degraded write."

If the missing block is a data block that is not being modified, this block can be ignored and a regular write performed. If, on the other hand, the missing block is a data block that is being modified, it should first be reconstructed from the RAID stripe using a degraded read in order to enable calculating the new redundancy information based on the old redundancy information. Thus, in an embodiment, the degraded write process is similar to the write process of FIG. 4, with the exception that some of the read-before-write operations are in effect degraded read operations.

If the stripe has one or more missing redundancy blocks, the server may perform the ATS command on the first available redundancy block. Unavailable redundancy blocks do not need to be reconstructed. If all redundancy blocks in the stripe are missing, the server may perform a regular write instead of an ATS command.

Extension to RAID Schemes Having Multiple Redundancy Blocks Per Stripe (e.g., RAID-6 and Beyond)

In some embodiments, system 20 may carry out the disclosed techniques with a RAID scheme that defines two or more redundancy blocks per RAID stripe. Typically, each redundancy block will contain a timestamp array 106 as explained above. In an embodiment, when performing a RAID transaction, only the first redundancy block is written using an ATS command, whereas the other redundancy block(s) are written using regular write commands.

When performing a degraded write, the writing server should perform locking (e.g., using an ATS command) based on the first available redundancy block (e.g., in RAID-6 having redundancy blocks p and q, if a storage device failure rendered p missing, the ATS command will be performed in writing q). When degraded write is performed without any redundancy block, the entire degraded write process may be performed using regular write commands, without ATS or other lock. Such a scenario may occur, for example, in RAID-6 with a double storage device failure that rendered both p and q missing.

Rebuild Process

After a storage device has failed and was replaced, the missing data blocks on that storage device can be rebuilt (or rebuilt even before the actual device is replaced into some spare capacity of the system). The rebuild process recreates missing data and/or redundancy blocks in the stripe via degraded reads for missing data blocks, and redundancy re-calculations for missing redundancy blocks. The rebuild process should write under a suitable lock (e.g., using ATS commands) similarly to the regular write operations described above.

In case the LUN or parts thereof are locked (e.g. under SCSI reservation), or in case of fully collaborative writers, the rebuild process should write the data blocks (and not only the redundancy blocks) using ATS, in order not to interfere with concurrent writes from the user (since the user is not aware that there is a potential for a write conflict).

Single Writer Optimization

Some of the complexity and latency of the ATS mechanism can be avoided if it is explicitly known that there is only a single writer for the LUN in question. A single-writer scenario may occur, for example, if there is only one server mapped to write to the LUN, or if there is a SCSI reservation that locks the LUN or parts thereof for exclusive writing. In case of a single writer, there is no need to perform ATS commands since there are no concurrent writers. This optimization reduces latency.

Moreover, in a single-writer scenario there is no need to read-before-write only for the purpose of ATS. For example, for a full-stripe write there is no need to read the first parity block (p). This optimization also reduces latency.

If additional writers are later mapped to the LUN, the single writer should be made aware of this fact and switch back to ATS-based operation. Before the mapping of the new writers can be completed, in-flight I/O requests should be allowed to complete. Typically, the rebuild process in this use case should write both data blocks and redundancy blocks under suitable locking (e.g., using ATS commands).

Full-Stripe Write Opportunistic Locking Optimization

When there are many full-stripe writes occurring from a given server to a given LUN, this scenario may be indicative of an intensive write pattern (e.g., sequential or large block). In such a case, locking the LUN (or parts thereof) for exclusive writes may be beneficial as the intensive write will be completed faster. Such a lock may even be beneficial for the other (locked-out) concurrent writers.

In some embodiments, server-local monitoring of I/O patterns may trigger upon a sufficiently-high quantity of sufficiently-large blocks during a certain period of time. Then, the server may attempt a SCSI reservation for exclusive writing to the LUN or parts thereof. This locking request is opportunistic, and if it fails the above-described ATS mechanism can be employed. The server should take care not to overuse the SCSI reservations, and the extent of use can be monitored via SCSI reservation failures that indicate high activity on the LUN.

Block Ordering in Stripe

In various embodiments, the servers may order the data and parity blocks in a stripe in various suitable orders. Different block orders enable different trade-offs between increasing the likelihood of full-stripe write operations and reducing the number of read operations.

Consider, for example a RAID scheme having n data block and m parity blocks, stored in a stripe over (n+m) disks. The size of a full-stripe write is (n)*(number_of_rows)*(disk_atomic_block_size). In an embodiment, the data blocks are written to a given stripe in column order, as follows:

|         | D 1 | D 2   | ... D n  | P          | Q          |
|---------|-----|-------|----------|------------|------------|
| Row = 1 | #1  | # r + 1 | ......   | P of row 1 | Q of row 1 |
| Row = 2 | #2  | # r + 2 | ......   | ...        | ...        |
| ...     | ... | ...   | ......   |            |            |
| Row = r | #r  | # 2r  | ... # n · r | P of row n | Q of row n |

Each column in the above table corresponds to a different physical disk. Each row in the table is a logical grouping of blocks that have one or more respective parity blocks calculated upon them (P and Q in the present example). A full-stripe write requires (r rows)*(n disks) writes. The blocks within the full stripe are written column-by-column (i.e., filling each column before proceeding to next).

The effect of this organization is that a trade-off can be struck between writing full stripes vs. performing as few disk read operations as possible. Consider, for example, the case of n=8, and disk_atomic_block_size=4 KB. If number_of_rows is 8, a full-stripe write is 256 KB in size, and thus less likely, but a 32 KB read will incur a single disk I/O. On the other hand, if number_of_rows is 1, a full-stripe write is 32 KB (and thus very likely), but a 32 KB read will incur 8 disk read I/Os.

The parameter number_of_rows is typically determined upon initialization (formatting) of the storage array, but allows flexibility to improve read performance or write performance based on the application being used.

Alternating Data/Parity Roles of Disks

In some redundancy calculation schemes, the parity information is accessed (and in particular written) much more frequently than the data. Thus, in some embodiments the system alternates the roles of disks 28 between stripes, so that each disk holds data in some stripes, and parity in other stripes. As a result, performance is balanced among the disks. In an example embodiment, the role is alternated every X stripes, as follows:

|                               | D 1 | D 2 | ... D n | D n + 1 | D n + 1 |
|-------------------------------|-----|-----|---------|---------|---------|
| Stripes 1 ... X               | d1  | d2  | ... dn  | P       | Q       |
| Stripes (X + 1) ... 2X        | d2  | d3  | ... P   | Q       | d1      |
| ...                           |     |     |         |         |         |
| Stripes ((n + 1)X) + 1 ... (n + 2)X | Q | d1 | ...    | dn      | P       |

In the above table, physical disks are denoted "D 1" ... "D n+1" while data blocks are denoted d1 ... dn. The parameter X may be determined and fixed, for example, upon initialization (formatting) of the storage array.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
   in a system that comprises multiple servers and multiple storage devices, holding in a server a definition of a stripe that comprises multiple memory locations on the storage devices, to be used by the servers for storing multiple data elements and at least a redundancy element calculated over the data elements; and
   modifying, by the server, one or more of the data elements in the stripe by:
   executing in the storage devices an atomic command, which updates the redundancy element to reflect the modified data elements only if a current redundancy element stored in the storage devices reflects the multiple data elements prior to modification of the data elements; and
   storing the modified data elements in the storage devices only in response to successful completion of the atomic command.

2. The method according to claim 1, wherein modifying the data elements comprises caching the modified data elements, the current redundancy element and the updated redundancy element in an interim memory, and committing the modified data elements and the updated redundancy element from the interim memory to the storage devices only in response to the successful completion of the atomic command.

3. The method according to claim 2, wherein the interim memory and the server belong to different failure domains of the system.

4. The method according to claim 1, wherein the stripe is accessible to at least one additional server, and wherein modifying the data elements is performed by the server without communication with the additional server.

5. The method according to claim 1, wherein modifying the data elements comprises reading current data elements and the current redundancy element from the storage devices, and updating the redundancy element based on the current data elements, the modified data elements and the current redundancy element.

6. The method according to claim 5, wherein modifying the data elements comprises, in response to failure of the atomic command, re-reading the current data elements and the current redundancy element from the storage devices, re-calculating the redundancy element and re-attempting to update the redundancy element using the atomic command.

7. The method according to claim 1, wherein storing the data elements and the redundancy element comprises storing respective timestamps with the data elements, and storing with the redundancy element a list of the timestamps of the data elements over which the redundancy element was calculated.

8. The method according to claim 7, and comprising, prior to modifying the data elements, verifying that the timestamps of the data elements prior to the modification match the list of timestamps stored with the current redundancy element in the storage devices.

9. A data storage apparatus, comprising:
an interface configured to communicate with multiple storage devices; and
a processor, which is configured to hold a definition of a stripe that comprises multiple memory locations on the storage devices to be used for storing multiple data elements and at least a redundancy element calculated over the data elements, and to modify one or more of the data elements in the stripe by:
  executing in the storage devices an atomic command, which updates the redundancy element to reflect the modified data elements only if a current redundancy element stored in the storage devices reflects the multiple data elements prior to modification of the data elements; and
  storing the modified data elements in the storage devices only in response to successful completion of the atomic command.

10. The apparatus according to claim 9, wherein the processor is configured to cache the modified data elements, the current redundancy element and the updated redundancy element in an interim memory, and to commit the modified data elements and the updated redundancy element from the interim memory to the storage devices only in response to the successful completion of the atomic command.

11. The apparatus according to claim 10, wherein the interim memory and the apparatus belong to different failure domains.

12. The apparatus according to claim 9, wherein the stripe is accessible to at least one additional data storage apparatus, and wherein the processor is configured to modify the data elements without communication with the additional data storage apparatus.

13. The apparatus according to claim 9, wherein the processor is configured to modify the data elements by reading current data elements and the current redundancy element from the storage devices, and updating the redundancy element based on the current data elements, the modified data elements and the current redundancy element.

14. The apparatus according to claim 13, wherein, in response to failure of the atomic command, the processor is configured to re-read the current data elements and the current redundancy element from the storage devices, to re-calculate the redundancy element and to re-attempt updating the redundancy element using the atomic command.

15. The apparatus according to claim 9, wherein the processor is configured to store respective timestamps with the data elements, and to store with the redundancy element a list of the timestamps of the data elements over which the redundancy element was calculated.

16. The apparatus according to claim 15, wherein, prior to modifying the data elements, the processor is configured to verify that the timestamps of the data elements prior to the modification match the list of timestamps stored with the current redundancy element in the storage devices.

17. A computing system, comprising:
multiple storage devices; and
multiple servers, wherein at least one of the servers is configured to hold a definition of a stripe that comprises multiple memory locations on the storage devices to be used by the servers for storing multiple data elements and at least a redundancy element calculated over the data elements, and to modify one or more of the data elements in the stripe by:
  executing in the storage devices an atomic command, which updates the redundancy element to reflect the modified data elements only if a current redundancy element stored in the storage devices reflects the multiple data elements prior to modification of the data elements; and
  storing the modified data elements in the storage devices only in response to successful completion of the atomic command.

18. The system according to claim 17, wherein the one of the servers is configured to cache the modified data elements, the current redundancy element and the updated redundancy element in an interim memory, and to commit the modified data elements and the updated redundancy element from the interim memory to the storage devices only in response to the successful completion of the atomic command.

19. The system according to claim 17, wherein the stripe is accessible to at least one additional server, and wherein the one of the servers is configured to modify the data elements without communication with the additional server.

20. The system according to claim 17, wherein the one of the servers is configured to store respective timestamps with the data elements, and to store with the redundancy element a list of the timestamps of the data elements over which the redundancy element was calculated.

21. The apparatus according to claim 20, wherein, prior to modifying the data elements, the one of the servers is configured to verify that the timestamps of the data elements prior to the modification match the list of timestamps stored with the current redundancy element in the storage devices.

22. A method for data storage, comprising:
in a system that comprises multiple servers and multiple storage devices, holding in a server a definition of a stripe that comprises multiple memory locations on the storage devices, to be used by the servers for storing multiple data elements and at least a redundancy element calculated over the data elements; and
modifying, by the server, one or more of the data elements in the stripe by:
  under a lock on at least part of the stripe, updating the redundancy element in the storage devices to reflect the modified data elements only if a current redundancy element stored in the storage devices reflects the multiple data elements prior to modification of the data elements; and
  storing the modified data elements in the storage devices only in response to successful completion of the updating of the redundancy element.

* * * * *